Jan. 13, 1942.  A. P. BRECKA  2,269,806
HITCH
Filed July 10, 1940  3 Sheets-Sheet 1

A. P. Brecka
INVENTOR.

BY Knowles
ATTORNEYS.

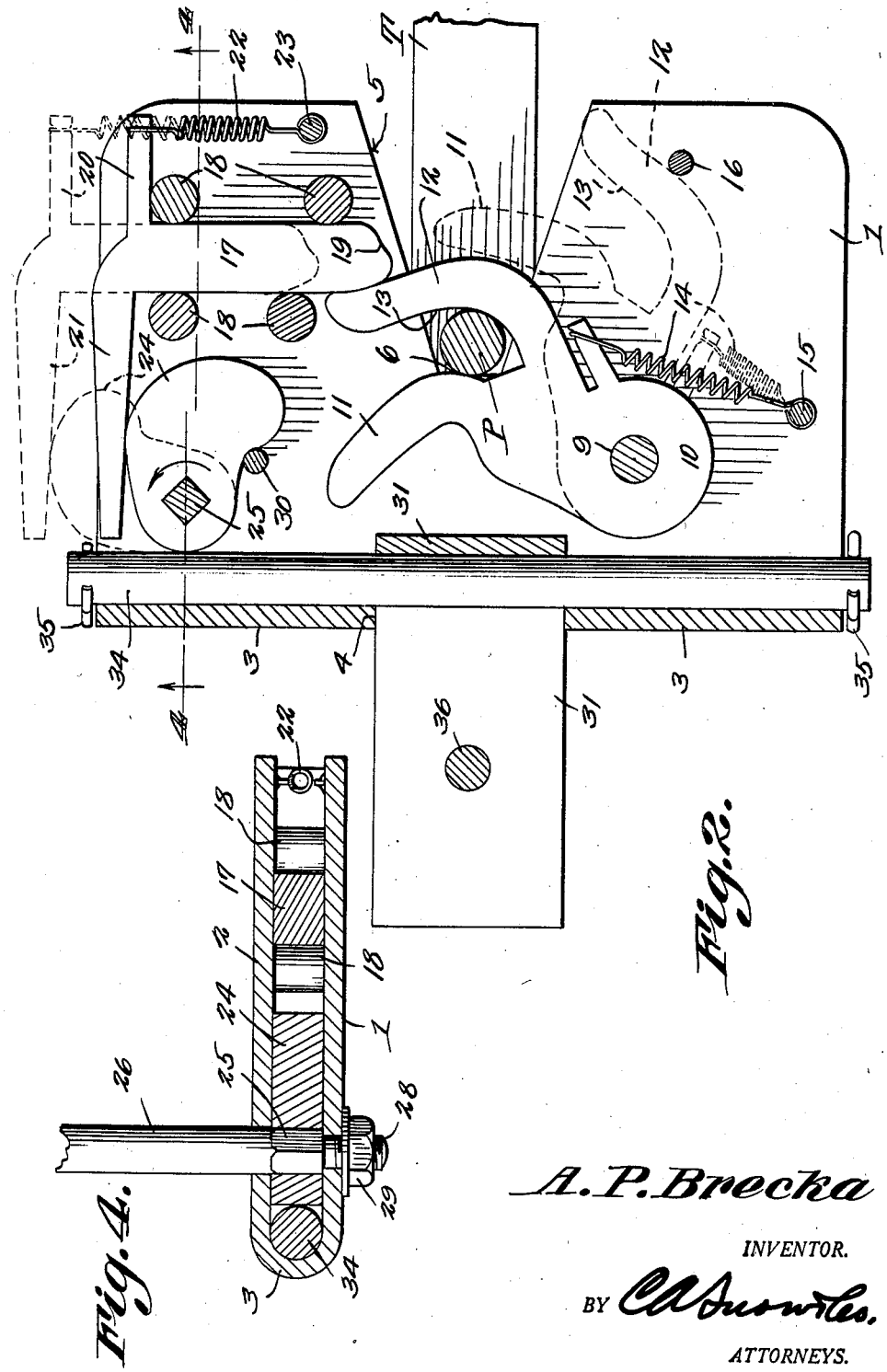

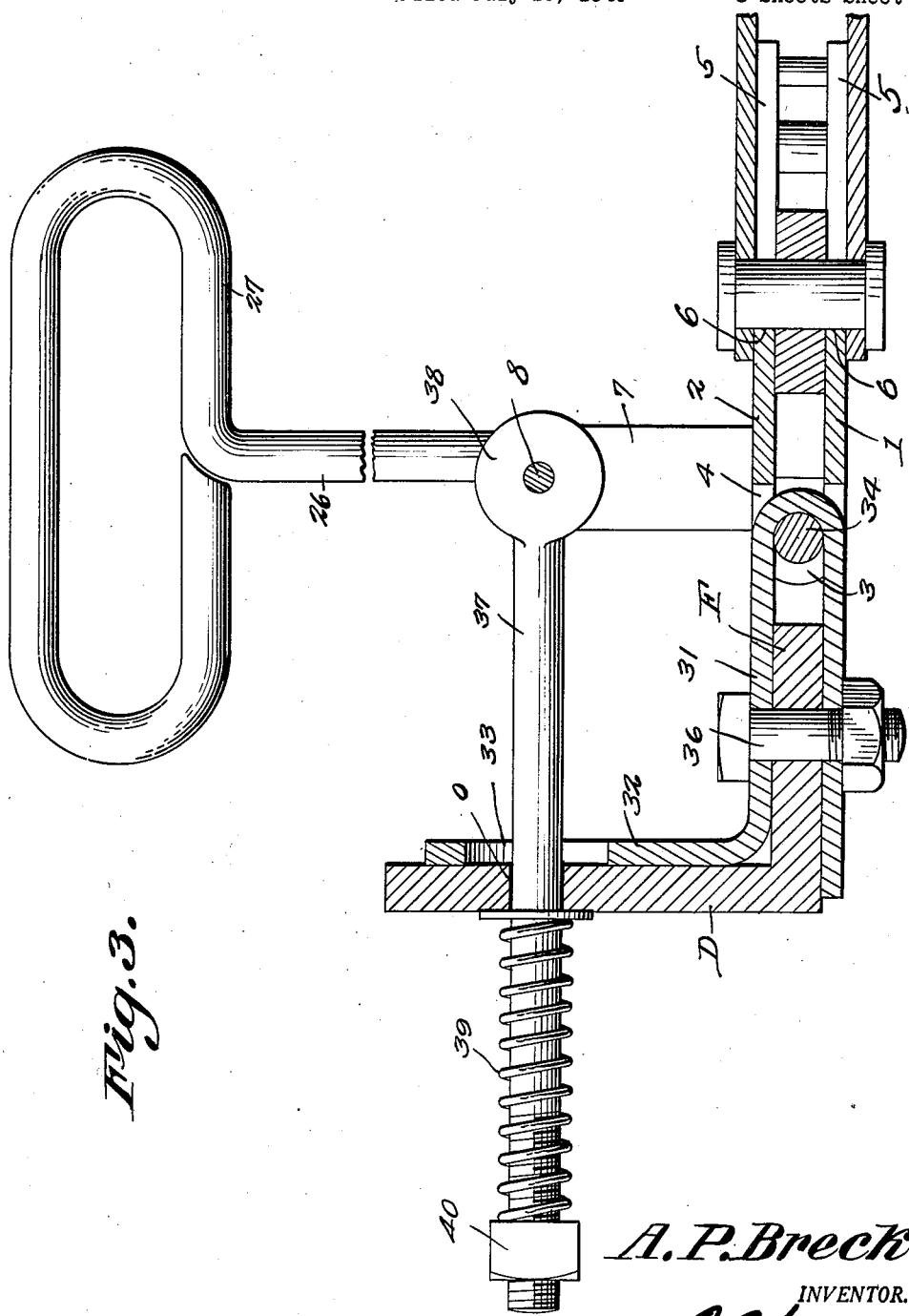

Patented Jan. 13, 1942

2,269,806

UNITED STATES PATENT OFFICE 2,269,806

HITCH

Anton P. Brecka, Prague, Nebr.

Application July 10, 1940, Serial No. 344,822

1 Claim. (Cl. 280—33.15)

This invention relates to a hitch designed primarily for use in connection with the draw-bar of a tractor.

An object of the invention is to provide a compact, durable and efficient device of this character which can be attached readily to a draw-bar and, when in position, will automatically engage and hold a coupling member when brought into position therein either by backing the tractor toward the implement to be coupled or by moving said implement toward the tractor.

A still further object is to provide a hitch having means for yieldingly supporting it in active position whereby it becomes possible for the hitch to move upwardly and downwardly while in use thereby to relieve the hitch from the severe strains to which it would be subjected otherwise.

Another object is to provide a hitch which is cheap to manufacture, the parts being readily assembled, and which can be actuated to quickly release the engaged parts.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 2 is a horizontal section through the hitch.

Figure 3 is a section on line 3—3, Figure 2.

Figure 4 is a section on line 4—4, Figure 2.

Figure 1:
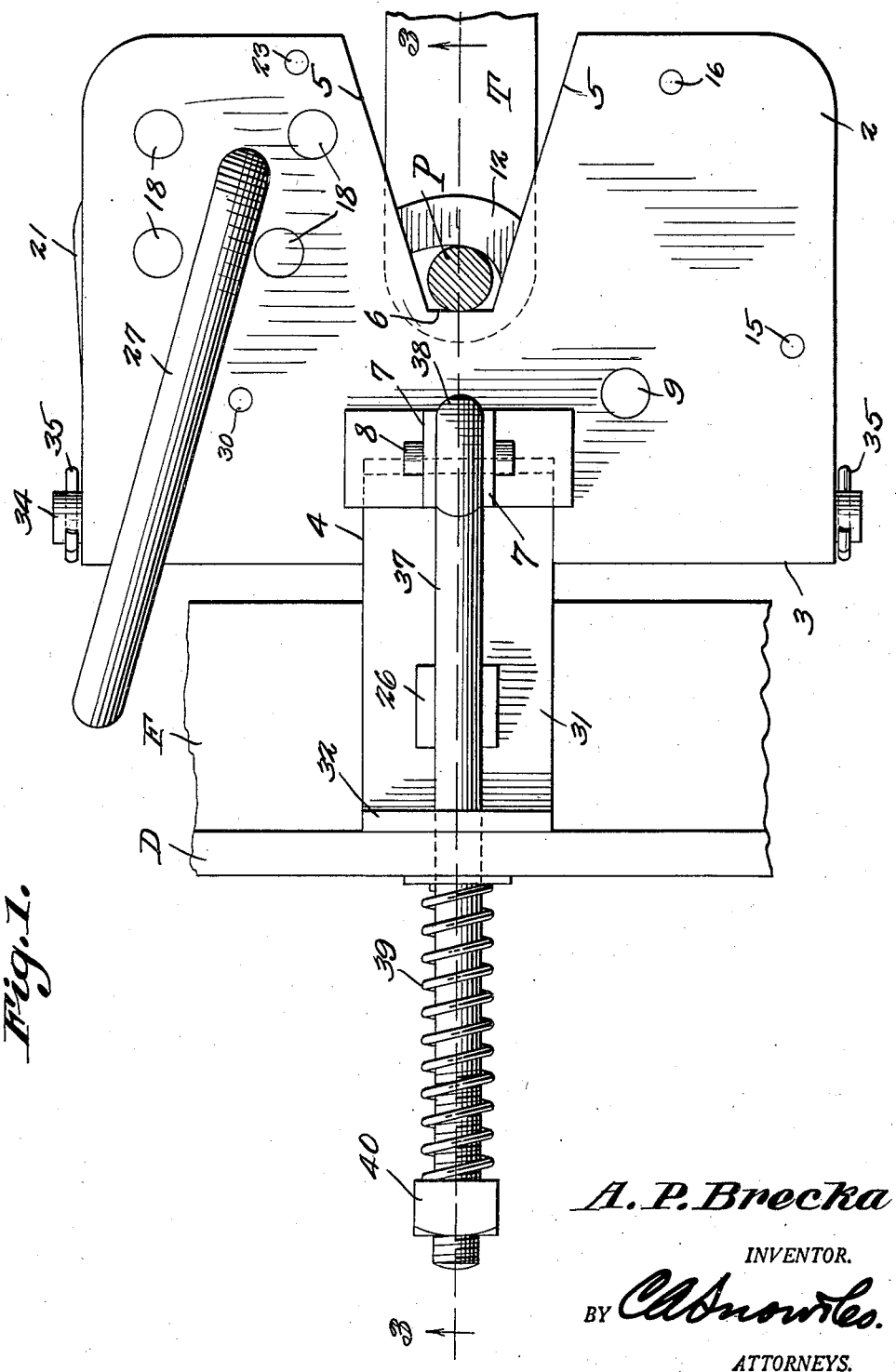
Figure 1 is a plan view of the hitch, a coupling pin being shown secured in position therein.

Referring to the figures by characters of reference, 1 designates the bottom plate and 2 the top plate of the body portion of the hitch, these two plates being formed from a single sheet of heavy metal folded to form a rounded portion 3 intersected at its center by a slot 4.

Matching recesses 5 are formed in the front portions of the bottom and top plates at the centers thereof, each of these openings having its walls converging toward slot 4 and terminating in a cross or inner end wall 6.

Spaced brackets 7 are welded or otherwise fixedly joined to the top plate 2 and are located between recess 5 and the rounded portion 3. These brackets are joined at their upper ends by a pivot pin 8.

Secured within the plates 1 and 2 beyond one side and back of the recesses 5 is a pivot bolt 9 on which a collar 10 is mounted to rotate. Extending from this collar is a thrust-receiving arm 11 so shaped and proportioned that, under normal conditions, it extends partly across the recesses 5 with its free end spaced from the walls 6 as shown by broken lines in Figure 2. A retaining arm 12 is also extended from the collar 10 but is spaced from arm 11 so as to form a throat 13 between the two arms. Arm 12 is so shaped and proportioned that when the parts are in their normal positions, as shown by broken lines in Figure 2, the free end of arm 12 will be retracted to position between the plates 1 and 2 and at one side of the recesses 5. When shifted to its other extreme position, however, the arm 12 will extend entirely across the recesses 5 as shown by full lines in Figure 2. A spring 14 which is located between the plates and connected at one end to collar 10 and at its other end to a pin 15 carried by the plates, serves to hold the arm 12 normally pressed against a stop pin 16 connecting the plates 1.

As will be noted by referring to Figure 2, collar 10 and its arms and spring are normally positioned between the plates adjacent to one side of the recesses 5. Between these recesses and the opposite side of the hitch body is located a sliding bolt 17 mounted to travel between guide bolts 18 arranged in pairs and connecting the plates 1 and 2. That end of the bolt nearest the recesses 5 is tapered to provide a cam surface 19. At the other end of the bolt are oppositely extending arms 20 and 21. Arm 20 is connected by a spring 22 to a pin 23 anchored in the plates 1 and 2. Thus the spring serves to hold the bolt 17 normally projected toward and close to one side of the recesses 5 where its beveled or cam-shaped end 19 is in the path of the free end of arm 12 when said arm is moved from its normal position to its other extreme position. Obviously during this movement said arm 12 will thrust against the cam end 19 of the bolt 17 and press said bolt out of the path of the arm and against the action of lever 22. However, as soon as arm 12 has moved past the end of bolt 17, the spring 22 will return the bolt to its normal position where it will lap the end portion of arm 12 and hold it against movement back to its normal position.

Arm 21, which is extended toward the rounded portion 3 of the body of the hitch, is normally contacted by a cam 24 mounted to swing back and forth between the plates 1 and 2.

Seated in this cam is the angular portion 25 of an upwardly extending operating rod 26 provided with a handle 27. The lower end of the rod is reduced in diameter and screw-threaded as shown at 28 for engagement by a retaining nut 29 or the like. This rod is rotatably mounted in the two plates 1 and 2 and obviously, when rotated in one direction, it will cause the cam 24 to swing in the direction indicated by the arrow in Figure 2, thereby causing the cam to thrust against arm 21 and retract the bolt 17 from the path of the arm 12. Normally, however, cam 24 is positioned as shown by full lines in Figure 2 at which time it can be in engagement with a stop pin 30 connecting the plates 1 and 2.

The draw-bar of a tractor has been indicated at D and this draw-bar has a forwardly extending flange F at its lower edge. It is also provided, near its upper end with an opening O. For the purpose of attaching the hitch to this draw-bar there is provided a coupling of novel construction. It comprises a metal strap bent into U-shape as shown at 31, there being an upwardly extending arm 32 formed by one end portion of the strap and adapted to bear against the upwardly extending portion of the draw-bar D as shown in Figure 3. This portion 32 has a longitudinal slot 33 into which the aperture O opens. Strap 31 is of a width substantially equal to the width of the slot 4 and is adapted to extend into said slot. A pivot pin 34 is extended through the coupling member 31, this pin being of such length as to extend transversely of the body of the hitch and beyond its end where it can be engaged by suitable retaining means such as cotter-pins 35. Thus the coupling member 31 is held securely to the body of the hitch and at the same time said body is free to swing upwardly and downwardly relative to the coupling. The coupling is joined to the draw-bar by means of a bolt 36 extended downwardly therethrough and through the flange F.

Slidable within the opening O and the slot 33 is a rod 37 having an eye 38 extending between the brackets 7 and engaged by the pivot pin 8. This rod projects through the draw-bar D and has a coiled spring 39 mounted thereon, one end of the spring exerting a thrust against the draw-bar D while the other end exerts a thrust against an adjusting nut 40 screwed onto the rod. By properly adjusting the spring the rod 37 will be caused to support the body of the hitch at any desired angle relative to the draw-bar under normal conditions.

As has heretofore been stated the arms 11 and 12 of the hitch are normally positioned as indicated by broken lines in Figure 2 and the cam 24 is normally positioned as indicated by full lines in said figure. When an implement is to be coupled to the draw-bar, the coupling pin P or other parts to be engaged by the hitch and which is carried by a tongue T or other part of the implement, is moved into the recesses 5 where it will come against arm 11 and thrust the arm away from its normal position into position between the walls 6 of the recesses and the slot 4. During this action the retaining arm 12 will move against the cam end 19 of bolt 17 and thrust the bolt out of the path thereof until arm 12 has moved past the bolt. At that time the bolt will be returned to normal position by its spring 22 so that the parts will be located as shown by full lines in Figure 2. Spring 14 is of course held under increased tension at this time. With the parts thus located the implement will be securely joined to the tractor and can be pulled thereby, the hitch being free to swing upwardly and downwardly to compensate for any corresponding movements of the implement relative to the tractor.

When it is desired to release the implement it is merely necessary to turn the handle 27 so as to move cam 24 in the direction indicated by the arrow in Figure 2. This will cause the cam to thrust against arm 21 and retract the bolt 17 against the action of spring 22 and out of the path of the arm 12. Thus said arm as well as the arm 11 will be free to return to their normal positions, thereby releasing tongue T from the hitch. Obviously when the cam 24 is released, the spring 22 will pull bolt 17 back to normal position, this action causing cam 24 to also return to normal position under pressure from arm 21.

What is claimed is:

A hitch for attachment to and extension rearwardly beyond the rear end of a vehicle frame, said hitch including spaced upper and lower members mounted for up and down swinging movement about an axis along one edge of the plates, there being recesses extending into those edges of the plates remote from the said axis, means between the plates for engaging and holding a coupling element inserted into the recesses, said means including a spring-restrained thrust-receiving arm extending between and mounted to swing toward and from the closed inner ends of the recesses, a retaining arm spaced from and movable with the thrust-receiving arm, said retaining arm being movable into position either across or removed from the recesses, a cam mounted to swing laterally between the plates, a sliding bolt between the plates, an arm thereon, a spring connected to the bolt and constituting means for pressing the bolt arm against the cam to hold the cam normally in a retracted position and for holding the bolt at one end normally projected into the path of the retaining arm for retraction by said retaining arm when moved to one extreme position, said cam and bolt arm cooperating for retracting the bolt from the path of the retaining arm.

ANTON P. BRECKA.